United States Patent
Domjan et al.

(10) Patent No.: US 7,414,792 B2
(45) Date of Patent: Aug. 19, 2008

(54) METHOD OF CHANGING THE INTER-PUPILAR DISTANCE OF A HEAD MOUNTED DISPLAY WHILE MAINTAINING A CONSTANT OPTICAL PATH LENGTH

(75) Inventors: László Domjan, Budapest (HU); Gábor Szarvas, Budapest (HU); Szabolcs Mike, Érd (HU)

(73) Assignee: Headplay (Barbados) Inc., Bridgetown (BB)

( * ) Notice: Subject to any disclaimer, the term of this patent is extended or adjusted under 35 U.S.C. 154(b) by 0 days.

(21) Appl. No.: 11/284,759

(22) Filed: Nov. 22, 2005

(65) Prior Publication Data

US 2006/0132925 A1    Jun. 22, 2006

Related U.S. Application Data

(63) Continuation-in-part of application No. 10/715,911, filed on Nov. 18, 2003, now Pat. No. 6,989,935.

(30) Foreign Application Priority Data

Nov. 19, 2002    (HU)    .................................... 0203993

(51) Int. Cl.
  *G02B 27/14*    (2006.01)
  *G09G 5/00*    (2006.01)
(52) U.S. Cl. .......................................... 359/630; 345/8
(58) Field of Classification Search ......... 359/630–634; 345/7–9
  See application file for complete search history.

(56) References Cited

U.S. PATENT DOCUMENTS 3,694,088 A    9/1972    Gallagher
4,575,722 A    3/1986    Anderson
5,029,261 A    7/1991    Koyama
5,035,474 A    7/1991    Moss et al.
5,129,716 A    7/1992    Holakovszky et al.
5,392,158 A    2/1995    Tosaki
5,621,572 A    4/1997    Fergason
5,677,628 A    10/1997   Watanabe et al.
5,682,173 A    10/1997   Holakovszky et al.
5,739,955 A    4/1998    Marshall
5,926,318 A    7/1999    Hebert
6,055,109 A    4/2000    Hur
6,094,309 A    7/2000    Ophey
6,111,408 A    8/2000    Blades et al.
6,147,805 A    11/2000   Fergason (Continued)

FOREIGN PATENT DOCUMENTS

EP    0 252 200    1/1988

(Continued)

OTHER PUBLICATIONS

Office Action/Examination Report (with English Language Translation) issued for Russian Application No. 2006124847, dated Aug. 15, 2007; 27 pages.

(Continued)

*Primary Examiner*—Alicia M Harrington
(74) *Attorney, Agent, or Firm*—Fulbright & Jaworski L.L.P.

(57) ABSTRACT

A mechanism for adjusting an apparatus for the inter-pupilar distance of a user is disclosed. Example embodiments of the disclosed mechanism use gears that link the movements of eye-optics and reflectors placed along the optical path. When the eye-optics are adjusted, this movement causes a movement in the linked reflectors that maintains a constant length for the optical path.

18 Claims, 6 Drawing Sheets

U.S. PATENT DOCUMENTS

| | | |
|---|---|---|
| 6,219,186 B1 | 4/2001 | Hebert |
| 6,226,076 B1 | 5/2001 | Yoshida |
| 6,246,383 B1 | 6/2001 | Ophey |
| 6,246,386 B1 | 6/2001 | Perner |
| 6,271,808 B1 | 8/2001 | Corbin |
| 6,417,820 B1 | 7/2002 | Choi et al. |
| 7,053,865 B2 * | 5/2006 | Takahashi .................. 345/7 |
| 2002/0000951 A1 | 1/2002 | Richards |
| 2002/0080496 A1 | 6/2002 | Kaschke et al. |
| 2003/0026586 A1 | 2/2003 | Bruegl et al. |
| 2004/0150888 A1 | 8/2004 | Domjan et al. |

FOREIGN PATENT DOCUMENTS

| | | |
|---|---|---|
| GB | 2332533 | 6/1999 |
| HU | 212 134 A | 6/1998 |
| HU | 216 221 B | 5/1999 |
| JP | 5-150182 A | 6/1993 |
| JP | 06-110014 | 4/1994 |
| JP | 06-305342 | 11/1994 |
| JP | 10-148789 | 6/1998 |
| JP | 11-295645 | 10/1999 |
| JP | 2000-284215 | 10/2000 |
| SU | 107668 | 11/1958 |
| TW | 175525 | 12/1991 |
| TW | 291987 | 11/1996 |
| TW | 567341 | 12/2003 |
| WO | WO 85/04961 | 11/1985 |
| WO | WO 99/31543 | 6/1999 |
| WO | WO 00/00119 | 1/2000 |
| WO | WO 01/59507 | 8/2001 |

OTHER PUBLICATIONS

Taiwanese Office Action and the Search Report (English Language Translation) issued for Application No. 092136589, dated Jul. 9, 2007; 3 pages.

Office Action/Examination Report (with English Language Translation) issued for Russian Application No. 2006124859; dated Sep. 12, 2007; 13 pages.

Russian Office Action issued for Russian Application 2006-124847 (English Translation) dated Mar. 18, 2008, 4 pgs.

* cited by examiner

METHOD OF CHANGING THE INTER-PUPILAR DISTANCE OF A HEAD MOUNTED DISPLAY WHILE MAINTAINING A CONSTANT OPTICAL PATH LENGTH

CROSS-REFERENCE TO RELATED APPLICATIONS

The present application is a continuation-in-part of U.S. patent application Ser. No. 10/715,911 entitled "OPTICAL ARRANGEMENTS FOR HEAD MOUNTED DISPLAYS," filed Nov. 18, 2003 now U.S. Pat. No. 6,989,935, the disclosure of which is hereby incorporated herein by reference.

PRIORITY

The present application claims priority to Hungarian Patent Application, Serial No. P 02 03993, Filed, Nov. 19, 2002, entitled "OPTICAL SYSTEM FOR A BINOCULAR VIDEO SPECTACLE," the disclosure of which is hereby incorporated herein by reference.

TECHNICAL FIELD

The invention relates generally to visual displays and more specifically to optical arrangements for head mounted systems that use a single display.

BACKGROUND OF THE INVENTION

Head Mounted Displays (HMDs) are a class of image display devices that can be used to display images from television, digital versatile discs (DVDs), computer applications, game consoles, or other similar applications. A HMD can be monocular ( a single image viewed by one eye), biocular (a single image viewed by both eyes), or binocular (a different image viewed by each eye). Further, the image projected to the eye(s) may be viewed by the user as complete, or as superimposed on the user's view of the outside world. HMD designs must account for parameters such as image resolution, the distance of the virtual image from the eye, the size of the virtual image (or the angle of the virtual image), the distortions of the virtual image, the distance between the left and the right pupil of the user (inter pupillar distance (IPD)), diopter correction, loss of light from image splitting and transmission, power consumption, weight, and price. Ideally, a single HMD would account for these parameters over a variety of users and be able to display an image regardless of whether it was a stereo binocular image or a simple monoscopic image.

If the resolution of a picture on the HMD's internal display is 800×600 pixels, an acceptable size for the virtual image produced by the HMD's optics is a virtual image diameter of approximately 1.5 m (52"-56") at 2 m distance which corresponds to approximately a 36° angle of view. To properly conform to the human head and eyes, the IPD should be variable between 45 mm and 75 mm. In order to compensate for near- and farsightedness, at least a ±3 diopter correction is necessary.

The use of only one microdisplay in the HMD (instead of using one for each eye) drastically reduces the price of the device. Typically, an arrangement for such a unit positions a microdisplay between the user's eyes. The image produced is then split, enlarged, and separately transmitted to each eye. There are numerous designs known in the art for beam splitting in single display HMDs with a center mounted display, but none are known that provide a solution that is cheap, light weight, small in size, and capable of displaying all varieties of images.

BRIEF SUMMARY OF THE INVENTION

Embodiments of the present invention present images produced by head mounted displays to a user by producing separate sub-images that are propagated through a plurality of optical sub-paths delivering the image to separate locations. Embodiments of the present invention hold constant the length of each optical sub-path during adjustments by coordinated the movements of the optical elements placed along the sub-paths.

Some embodiments utilize diffusers places in the optical sub-path onto which real images of the display are formed. By coordinating the lateral movement of eyepiece optics necessary to correct for inter-pupilar distances with proportional movement of the diffusers, embodiments of the present invention are thus capable of maintaining a constant length for the optical sub-paths.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
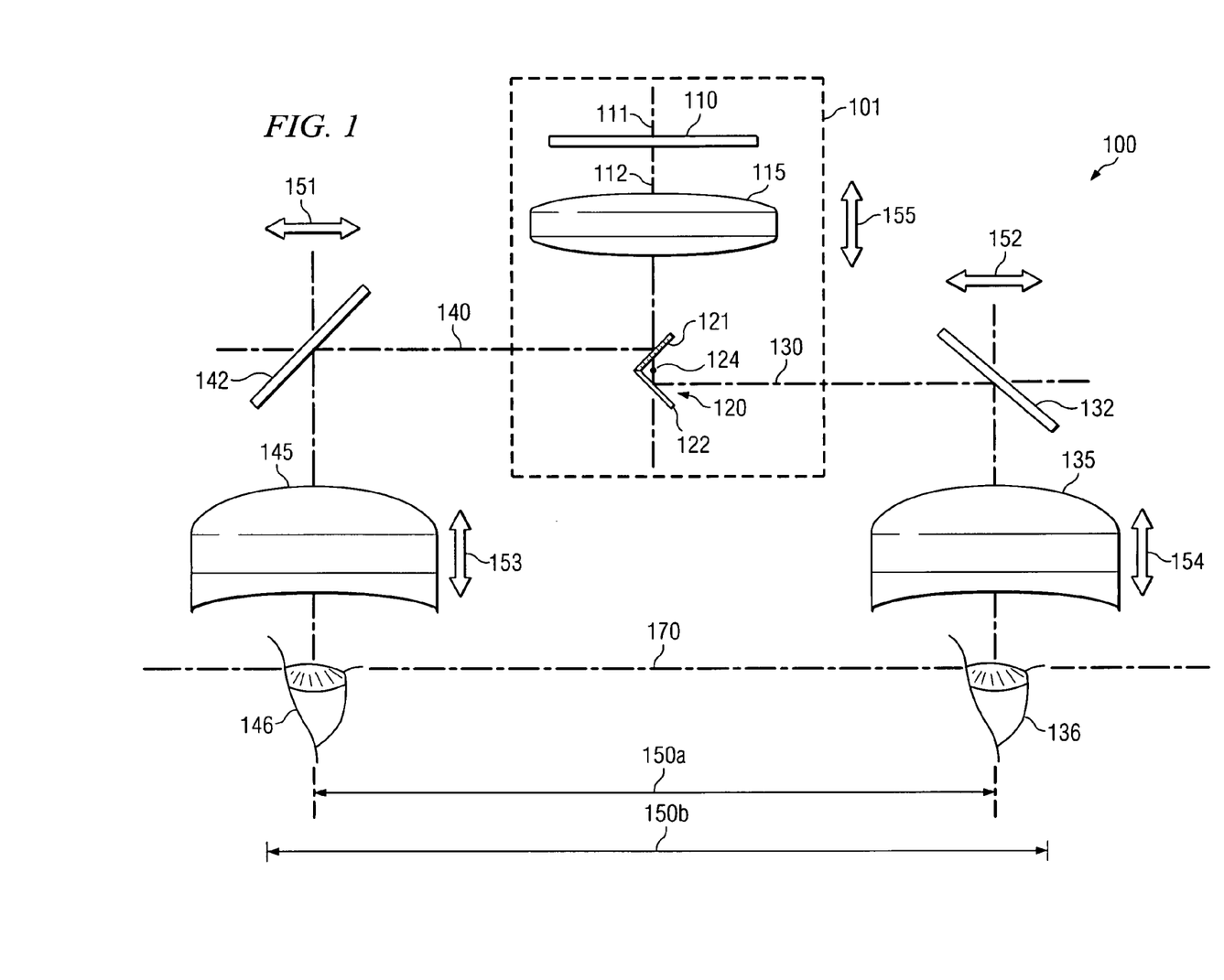
FIG. 1 illustrates a top view of a head mounted display arranged according to an embodiment of the present invention.

FIG. 1 illustrates a top view of head mounted device 100 arranged according to an embodiment of the present invention. Sub-image creation section 101, within device 100, creates a plurality of sub-images from a single image source into a plurality of optical sub-paths. Display 110 can be any suitable apparatus or screen operable to display a visual image of data, such as a liquid crystal display (LCD) screen. Display 110 is situated along a display axis 111, which, in the embodiment shown, is normal to the screen of display 110 and perpendicular to facial plane 170 of a user. Display 110 is designed to project a display image along optical path 112. In the arrangement of section 101, optical path 112 lies along display axis 111. Display lens 115 is located along, and perpendicular to, optical path 112, and has display lens focal point 124. Display lens focal point 124 lies on optical path 112, and section 101 is arranged such that display lens focal point 124 lies within splitter 120. By focusing the display image before it is split, the splitting of volume of sub-image creation section 101 can be greatly reduced. A small splitting volume allows an embodiment to use small, light-weight splitting elements and allows HMD designs to include advantageous arrangements and additional optical elements that improve image quality and can increase the size of the image viewed by a user. The embodiment of FIG. 1 is arranged to produce an image through (approximately) collimated light emanated by (or being reflected from) display 110, thus splitter 120 is placed proximate to display lens focal point 124. The embodiments are not limited to this arrangement however, as splitter 120 should be arranged in the position most appropriate to the focused image. For example, if display 110 emits, transmits, or reflects non collimated light, the display image will be focused to a "point" that is not display lens focal point 124, and embodiments will arrange splitter 120 in a position proximate to this focal area.

In embodiments using the arrangement of section 101, splitter 120 is an asymmetric V-mirror splitter composed of a partially reflective surface 121 and a fully reflective surface 122. The proximity of surfaces 121, 122 will be dependent upon the size of splitter 120 and the amount of splitter volume reduction section 101 is arranged to produce. Section 101 is further arranged so that surface 121 and surface 122 share a common edge, and are arranged asymmetrically about display axis 111. Section 101 can thus split a display image of display 110 into two separate display sub-images. The term sub-image is used to describe the multiple images of a display created by the various embodiments of the present invention. The sub-images of FIG. 1 contain all of the information of a display, but embodiments may use sub-images that contain only a portion of an image.

Upon striking partially reflective surface 121, a portion of a display image is reflected along left-eye optical sub-path 140, and becomes a left-eye sub-image. The portion of a display image not reflected by partially reflective surface 121 passes through and strikes fully reflective surface 122, becoming a right-eye sub-image, which is reflected along right-eye optical sub-path 130. The result is an identical left-eye sub-image and right-eye sub-image traveling in opposite directions and containing identical image information.

Left-eye sub-image will follow optical sub-path 140 and be channeled to left eye 146 of a user. Placed along optical sub-path 140 is left-eye reflector 142, which is a fully reflective surface arranged to redirect left-eye optical sub-path 140 by 90° and into left eyepiece optics 145. The right-eye sub-image will follow optical sub-path 130 and be channeled to right eye 136 of a user. Placed along optical sub-path 130 is right-eye reflector 132, which is a fully reflective surface arranged to redirect right-eye optical sub-path 130 by 90° and into right eyepiece optics 135. Right eyepiece optics 135 and left eyepiece optics 145 can be a single lens or a combination of several lenses designed to appropriately magnify a right-eye sub-image for viewing by right eye 136 of the user and a left-eye sub-image for viewing by left eye 146 of the user, respectively.

Eyepiece optics 135 and 145 are adjustable single lenses, but other embodiments may use multiple lenses or any other arrangement that appropriately focuses a right-eye sub-image and a left-eye sub-image for viewing by right eye 136 and left eye 146, respectively. Further, although reflectors 142, 132 of device 100 are depicted as mirrors, embodiments are not limited to the use of mirrors for redirecting an optical sub-path. Rather, prisms, partially reflective surfaces, polarizing beam splitters, or any other suitable arrangements can be used for redirecting an optical sub-path.

Device 100 is also capable of adjusting for the varying IPDs of different users through the synchronized movements of optical elements. Right eyepiece optics 135 and left eyepiece optics 145 can shift through movements 152 and 151 respectively to create IPD 150a and IPD 150b, when section 101 shifts through movement 155. When IPD distance 150a is changed to IPD 150b, section 101 is simultaneously shifted toward facial plane 170 in movement 155 (downwards in the view of FIG. 1). When IPD 150b is changed to 150a, section 101 is simultaneously shifted away from plane 170 (upwards in the view of FIG. 1). These synchronized movements allow device 100 to adjust to accommodate for the entire range between IPD 150a and 150b while maintaining constant distances between surfaces 122, 121 and eyepiece optics 135, 145 along sub-paths 130 and 140, respectively. Device 100 is also capable of diopter correction through additional adjustments of movement 153 of left eyepiece optics 145 and movement 154 of right eyepiece optics 135.

Figure 2:
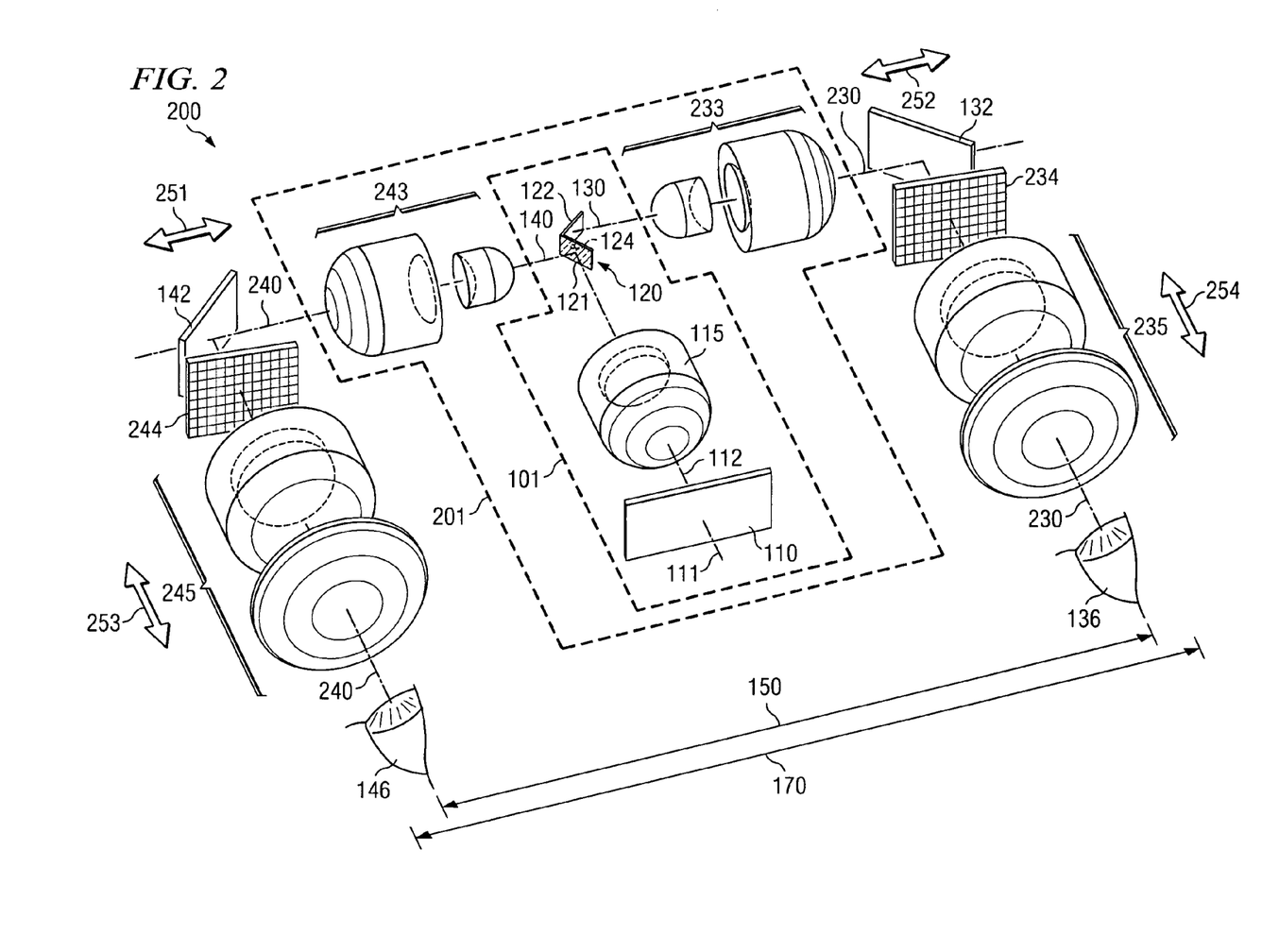
FIG. 2 illustrates a prospective view of a head mounted display arranged according to an embodiment of the present invention.

FIG. 2 illustrates a prospective view of head mounted device 200 arranged according to an embodiment of the present invention. Head mounted device 200 includes section 101, as described in relation to FIG. 1, which operates to split a display image of display 110 into a left-eye sub-image traveling along left-eye optical sub-path 140 and a right-eye sub-image traveling along right-eye optical sub-path 130. For device 200, left-eye transition optics 243 are placed along left-eye optical sub-path 140 to adjust the left-eye sub-image for reflection by left-eye reflector 142 onto left-eye diffuser 244. The left-eye sub-image strikes the left-eye diffuser 244 and creates a real image of the display on the diffuser surface. The left eyepiece compound optics 245 then magnifies this real image appropriately for left eye 146.

The embodiment depicted in FIG. 2 is described using diffusers onto which real images are projected in order to prepare the image. Transition optics, having a small numerical aperture, project a real image onto the diffuser surface, and eyepiece optics having a large numerical aperture transport the image to the eyes of a user. Rather, any appropriate means may be used including microlens arrays, diffraction gratings, or other diffractive surfaces. For the purposes of the present invention, it will be understood that "diffuser" as used to describe the embodiments of the present invention, refers to all such means used to convert incident angular power density into an appropriate exiting angular power density.

In FIG. 2, a right-eye sub-image follows the right-eye optical sub-path 130 into right eye transition optics 233. The right eye transition optics 233 adjusts the right-eye display sub-image appropriately for reflection by right-eye reflector 132 onto right-eye diffuser 234. The right-eye sub-image strikes right-eye diffuser 234 and creates a real image. This real image is adjusted by right eyepiece compound optics 235 appropriately for right eye 136. Device 200 is capable of diopter correction through movement 253 of left-eye compound optics 245 and of movement 254 of right-eye compound optics 235.

Device 200 is also capable of IPD adjustment through multiple synchronous movements. IPD 150 can be shortened by shifting left-eye compound optics 234 to the right with movement 251, and right-eye compound optics 235 to the left with movement 252. For the embodiment of FIG. 2, segment 240 of optical sub-path 140 lies between transition optics 243 and diffuser 244, and segment 230 of optical sub-path 130 lies between transition optics 233 and diffuser 234. Thus, as compound optics 235 and 245 are shifted in movement 252 and 251 to shorten distance 150, center section 201 should be shifted away from the facial plane 170. The embodiment of FIG. 2 describes one combination of synchronous movements that result in IPD adjustment, but embodiments of the present invention are not limited to the synchronous movements of FIG. 2.

FIG. 3 illustrates a prospective view of a head mounted device arranged according to an embodiment of the present invention. Head mounted device 300 includes section 101, as described in relation to FIG. 1, to split a display image of display 110 into a left-eye sub-image traveling along left-eye optical sub-path 140 and a right-eye sub-image traveling along right-eye optical sub-path 130. In the embodiment depicted in FIG. 3, a left-eye display sub-image follows left-eye optical sub-path 140 and passes through a left-eye real image reflector 342 to strike left-eye reflective diffuser 343, thus creating a real image. This real image is then reflected by left-eye real image reflector 342 into left eyepiece optics 145. Left eyepiece optics 145 adjusts a reflected real image appropriately for left-eye 146. A right-eye display sub-image will follow right-eye optical sub-path 130 passing through right-eye real-image reflector 332 to strike right-eye reflective diffuser 333, thus creating a real image. This real image is reflected by right-eye real-image reflector 332 into right eyepiece optics 135 which will adjust a reflected real-image appropriately for right-eye 136.

Figure 3A:
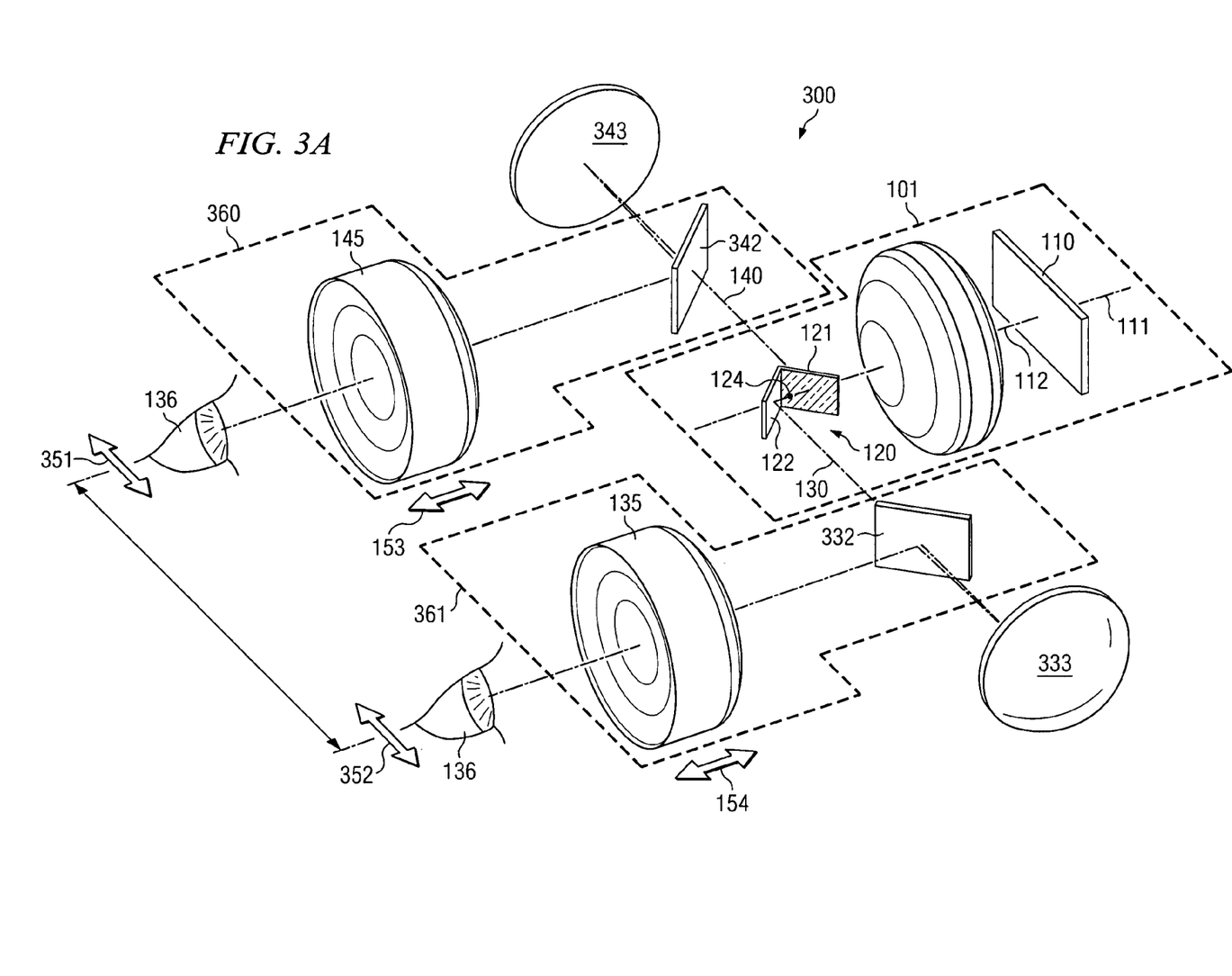
FIG. 3A illustrates a prospective view of a head mounted display arranged according to an embodiment the present invention showing diopter correction.
Figure 3B:
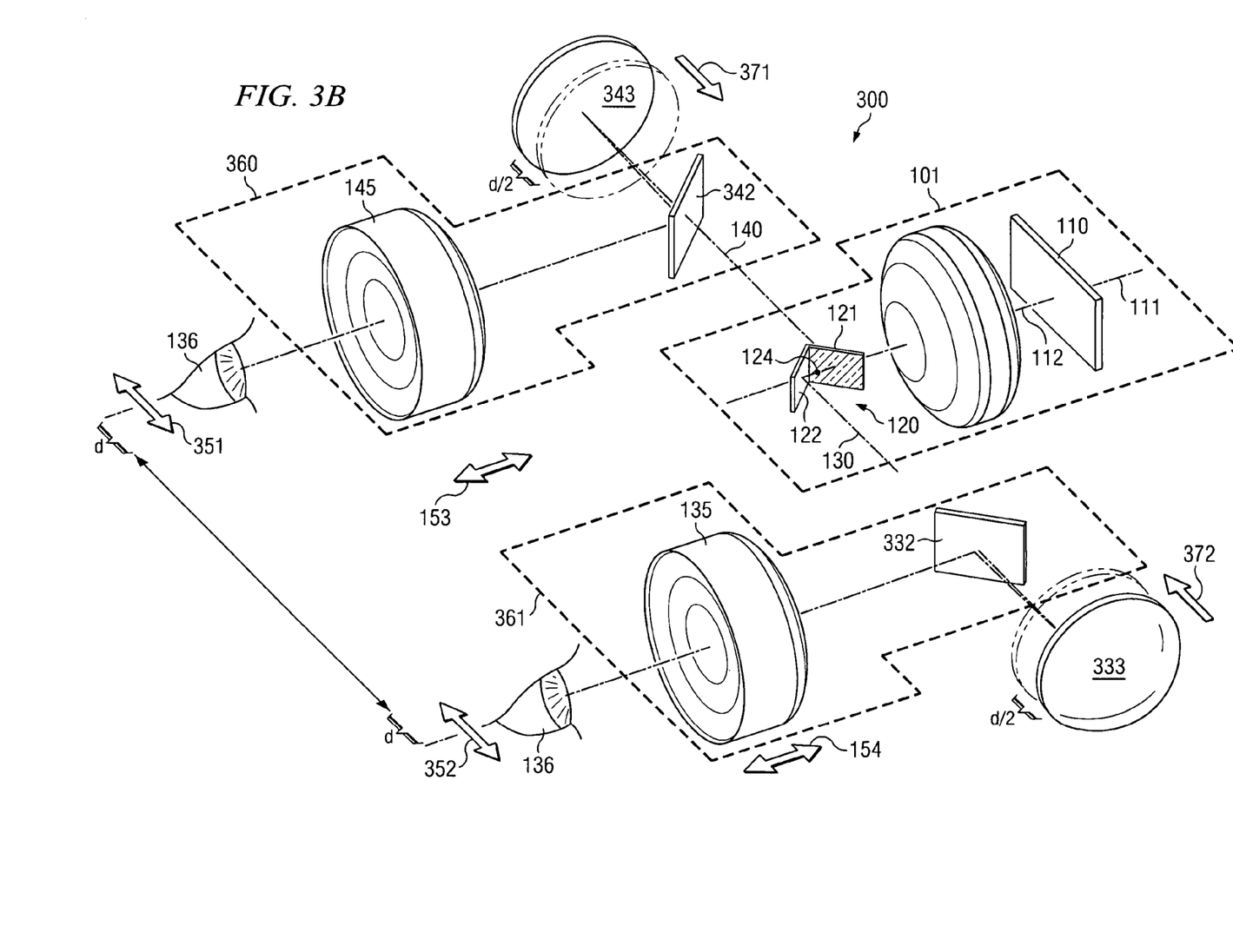
FIG. 3B illustrates a prospective view of the head mounted display of FIG. 3A showing the simultaneous movements utilized to make the IPD adjustment.

The embodiment depicted in FIGS. 3A and 3B is described as using reflective diffusers on which real images are formed. The present invention is not limited to the use of any one type of diffuser. Rather, the embodiments may use any appropriate diffuser, as previously described, and may be any appropriate shape such as spherical, flat, or aspheric.

The embodiment in FIG. 3A is also capable of diopter correction through movement 153 of left eyepiece optics 145 and movement 154 of right eyepiece optics 135. Left-eye real-image reflector 342 and left eyepiece optics 145 collectively make up left eyepiece 360. Right-eye real-image reflector 332 and right eyepiece optics 135 collectively make up right eyepiece 361.

Device 300 is capable of IPD adjustment through multiple simultaneous movements. The embodiment of FIG. 3 simultaneously moves left eyepiece 360 and right eyepiece 361 through movements 351 and 352 respectively to set the correct IPD. At the same time, movement 153 of left eyepiece optics 145 and movement 154 of right eyepiece optics 135 are moved to maintain the optical path lengths between eyepiece optics 145, 135 and reflective diffusers 343, 333.

FIG. 3B illustrates the simultaneous movements one embodiment of the present invention utilizes to make the IPD adjustment described for FIG. 3A. As described above, IPD correction involves lateral movements 351 and 352 (of length d in FIG. 3A) of eyepieces 360 and 361. When such movements are made, however, the optical sub-paths 140 and 130 become longer. In order to maintain a constant length for optical sub-paths 140 and 130, diffusers 343 and 333 are simultaneously perform lateral movements 371 and 372 (of length ½d in FIG. 3A). In preferred embodiments, movement 351 is linked with movement 371 and movement 352, but movements 352 and 351 are independent of each other.

Figure 3C:
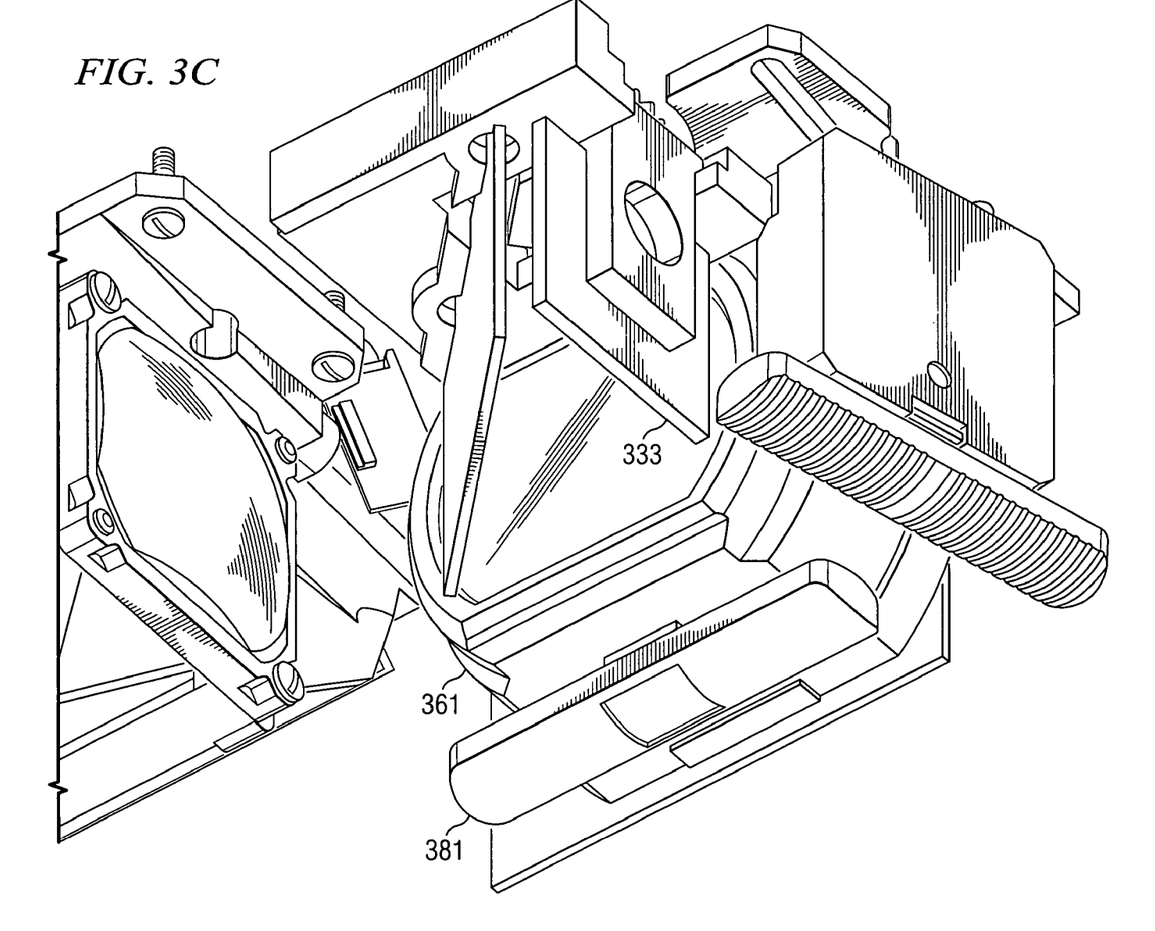
FIGS. 3C and 3D illustrate a prospective view of the head mounted display of FIG. 3A showing the specific gear arrangements that can perform the linked movements of FIG. 3A.
Figure 3D:
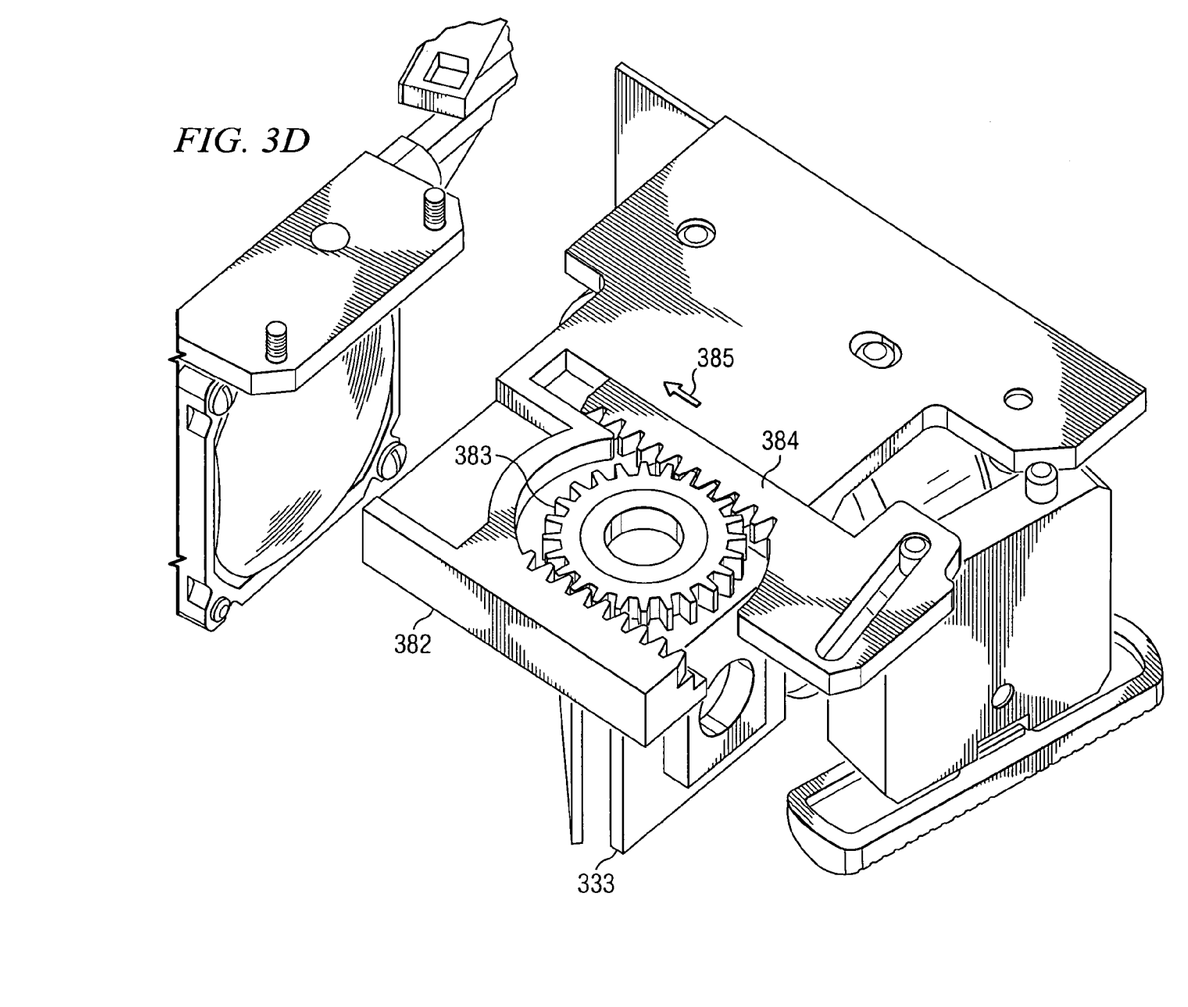

FIGS. 3C and 3D illustrate one embodiment specific gear arrangements that can perform the linked movements described. The user adjusts IPD by sliding button 381 which is fixed directly to eye-piece 362. As eyepiece 362 moves left and right, gear rack 382 drives idler gear 383 mated with 'baseline' rack 384. Diffuser 333 (represented in the embodiment of FIGS. 3C and 3D as a mirror) is mounted onto idler gear 383, which ensures that when the eyepiece 362 moves a certain distance, diffuser moves exactly half that distance. This linkage ensures that the optical sub-path 130 is a constant distance for all IPD values.

To allow for diopter correction, 'baseline' rack 384 is moved in direction 385 (towards optical axis 111), which in turn moves idler gear 383 and diffuser 333 towards beam splitter 120 (not shown), there by shortening optical sub-path 130 and moving the virtual image closer to the viewer. Rather than focusing the system, the virtual image is moved to the view where a user can see the image within their 'diopter limits'. The mechanical of FIGS. 3C and 3D allows for a very flexible system that ensures that diffuser 333 is synchronized to eyepiece 362 and maintains a constant length for optical sub-path 362 for all IPD adjustments while maintaining any given 'baseline' diopter adjustment value. A similar system may be used for eyepiece 361 to ensure a constant length for optical sub-path 140. Together, such systems provide independent left and right diopter correction.

In device 300, left-eye real-image reflector 342 and right-eye real-image reflector 332 are partially reflective surfaces, but embodiments are not limited to the arrangement depicted. Rather, embodiments may easily be adapted to any arrangement, such as those using prisms, or polarizing beam splitters, that appropriately reflect light into eyepiece optics 135 and 145 and transmit light from optical paths 130, 140 towards reflective diffusers 333, 343, respectively.

The embodiments of the present invention are not limited to arrangements that place an image splitter proximate to the focal point of a focusing optic. Rather, embodiments of the present invention are able to reduce the splitting volume of various applications, by positioning the image splitter to split a display image focused in a small area.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for channeling a displayed image, said system comprising:

a display that projects an image along an optical path;

a lens that focuses the image;

a splitter in proximity to a focal point of said image for creating a plurality of display sub-images, each said sub-image following one of a plurality of optical sub-paths;

eye-optics placed along said at least one optical sub-path; and means for forming a real-image arranged along said at least one optical sub-paths, arranged between said splitter and said eye-optics, and wherein a movement of said forming means maintains a constant length for said optical sub-path.

2. The system of claim 1 wherein said movement of said forming means may be used to adjust for inter pupilar distance.

3. The system of claim 1 wherein said forming means is a spherical diffuser.

4. The system of claim 1 wherein said forming means is a diffraction grating.

5. The system of claim 1 wherein said forming means is a microlens array.

6. The system of claim 1 wherein said movement of said forming means counteracts a movement of said eye-optics.

7. A method of maintaining a constant optical path length, said method comprising:

generating a sub-image that follows an optical path through eye-optics to an eye of a user;

arranging an optical element along said optical path before said eye-optics; and linking a physical movement of said optical element with a movement of said eye-optics, wherein said optical element movement counteracts said eye-optics movement thereby maintaining said constant length of said optical path.

8. The method of claim 7 further comprising:

orienting said eye-optics and said optical element at approximately ninety degrees with respect to each other.

9. The method of claim 8 further comprising:

arranging a beam splitter along said optical path, wherein said beam splitter passes at least a portion of said sub-image to said optical element and reflects light from said optical element into said eye-optics.

10. The method of claim 9 wherein said sub-image is reflected by said optical element.

11. The method of claim 10 wherein a real image is created on said optical element.

12. The method of claim 7 wherein said eye-optics movement is a movement used to adjust a head mounted display for the inter pupilar distance of said user.

13. A head mounted display, said display comprising:

a first optical path;

a first diffuser placed in said first optical path forming a first real image;

a first eye-optics transmitting said first real image to a first eye of a user;

a first optical element placed in said first optical path reflecting said first real image into said first eye-optics; and first gearing means for linking movement of said first optical element relative to said first eye-optics;

wherein said linked movements accommodate an interpupilar distance of a user while maintaining a constant length for said first optical path.

14. The head mounted display of claim 13, further comprising:

a second optical path;

a second diffuser placed in said second optical path forming a second real image;

a second eye-optics transmitting said second real image to a second eye of a user;

a second optical clement placed in said second optical path reflecting said second real image into said second eye-optics; and second gearing means for linking movement of said second optical element and said second eye-optics;

wherein said second gearing means is capable of adjusting said head mounted display to an inter pupilar distance of a user and maintaining a constant length for said first optical path.

15. The head mounted display of claim 14 wherein said first optical element alters said first optical path by approximately ninety degrees, and second optical element alters said second optical path by approximately ninety degrees.

16. The head mounted display of claim 14 wherein said first and second optical elements are partially reflective surfaces arranged such that light following said first optical path passes though said first optical element to impact said first diffuser, and that light following said second optical path passes though said second optical element to impact said second diffuser.

17. The head mounted display of claim 14 wherein said first and second optical elements are polarizing beam splitters.

18. The head mounted display of claim 14, wherein first and said second gearing means are independent.

\* \* \* \* \*